UNITED STATES PATENT OFFICE.

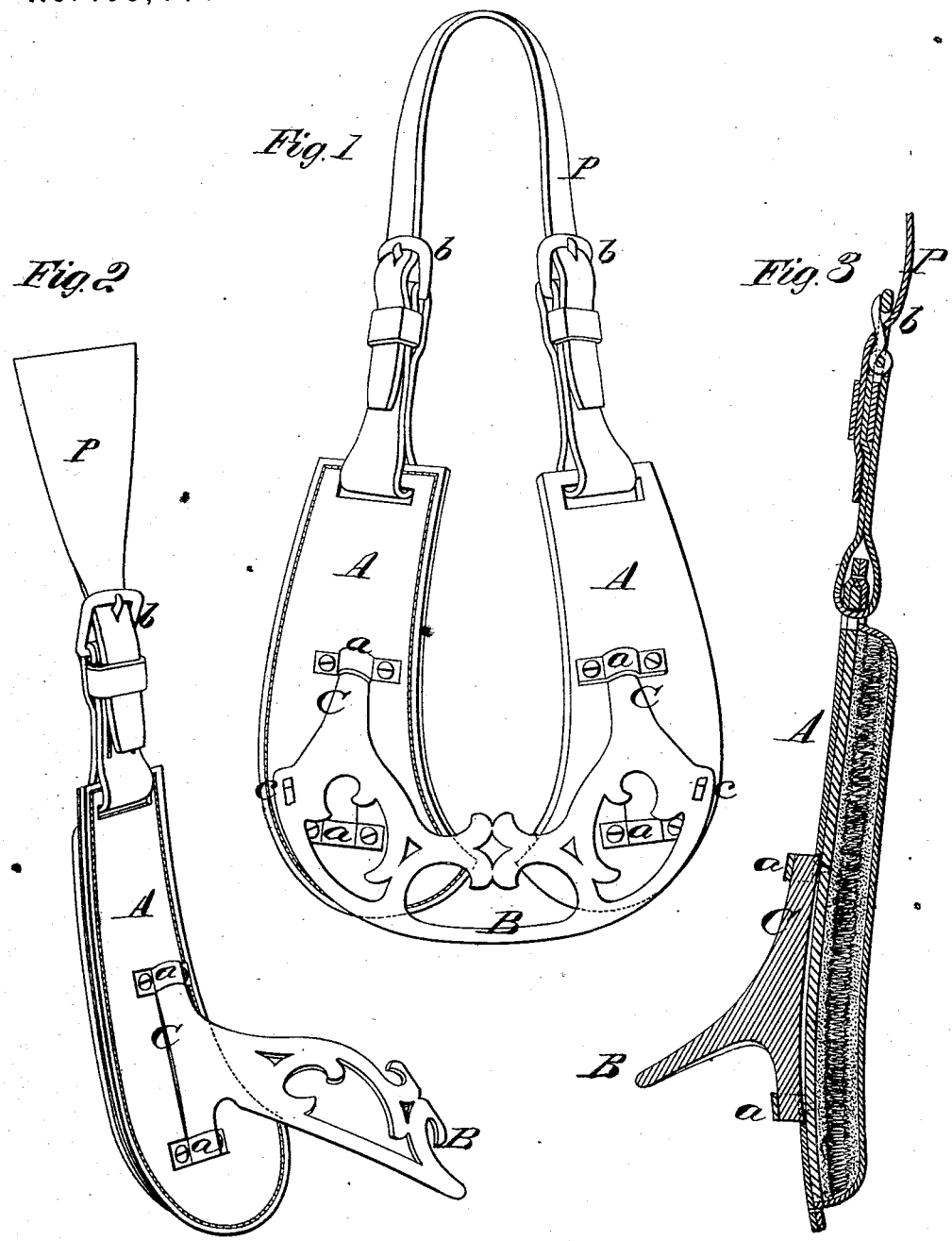

GEORGE F. BEARDSLEY, OF GLEN'S FALLS, NEW YORK.

IMPROVEMENT IN HORSE-COLLARS.

Specification forming part of Letters Patent No. 163,444, dated May 18, 1875; application filed October 10, 1874.

*To all whom it may concern:*

Be it known that I, GEORGE F. BEARDSLEY, of Glen's Falls, in the county of Warren and State of New York, have invented a new and valuable Improvement in Harness Attachments; and I do hereby declare that the following is a full, clear, and exact description of the construction and operation of the same, reference being had to the annexed drawings making a part of this specification, and to the letters and figures of reference marked thereon.

Figure 1 of the drawing is a representation of a plan view of my harness attachment. Fig. 2 is a detail view of the same, and Fig. 3 is a sectional view.

This invention consists in the employment of two concavo-convex pads, extending longitudinally along the shoulders of a horse and conforming thereto, and hinged to a rigid bow, and suspended by a neck-strap, in combination with means for attaching the hames to said bow, as will be hereinafter explained.

In the annexed drawings, A A designate two curved and concavo-convex pads, which are adapted to fit the breast of a horse snugly, and which may be made of metal, suitably cushioned and covered. B designates a connecting-bow, which may be made highly ornamental, and which is constructed with pivotal portions C C on its extremities, that are connected to the breast-pads A A by means of straps $a$ $a$. This connects together the pads, and allows them to articulate freely, and accommodate themselves to the breast of a horse on opposite sides of the median line. The pads are, when in use, suspended from the animal's neck by means of a neck-strap, P, to which buckles $b$ $b$ are attached for adjusting the pads to the animal. At $c$ $c$ holes are made through the ends of the bow, to which the tugs are attached, by which the animal draws the vehicle.

I am aware that a breast-collar composed of a metallic half-circle, with adjustable pads attached thereto, has heretofore been employed, and I therefore lay no claim thereto, as such collar can be applied only to the breast of an animal and in light draft, while my invention is particularly applicable to heavy draft, where the power must be applied to the shoulders of the animal, and is used in lieu of hames and the ordinary collar.

What I claim as new, and desire to secure by Letters Patent, is—

In a horse-collar, the combination, substantially as described, of the concavo-convex pads A A, suspended by the strap P, attached to their ends, and connected by a single rigid bow, B, having loops, and hinged to said pads.

In testimony that I claim the above I have hereunto subscribed my name in the presence of two witnesses.

GEORGE FAYETT BEARDSLEY.

Witnesses:
 WILLIAM HOTCHKISS,
 A. J. CHERITUE.